United States Patent
Prasad et al.

(10) Patent No.: US 8,238,366 B2
(45) Date of Patent: Aug. 7, 2012

(54) WIRELESS COMMUNICATION RATE ALLOCATION ON A GAUSSIAN INTERFERENCE CHANNEL

(75) Inventors: Narayan Prasad, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 889 days.

(21) Appl. No.: 12/273,810

(22) Filed: Nov. 19, 2008

(65) Prior Publication Data

US 2009/0129328 A1 May 21, 2009

Related U.S. Application Data

(60) Provisional application No. 60/988,832, filed on Nov. 19, 2007.

(51) Int. Cl.
*H04J 3/16* (2006.01)

(52) U.S. Cl. .................................. 370/468; 370/232
(58) Field of Classification Search .................. 370/335, 370/232, 468, 252, 230
See application file for complete search history.

(56) References Cited

U.S. PATENT DOCUMENTS 6,947,407 B2 * 9/2005 Ayyagari et al. .............. 370/342
* cited by examiner

*Primary Examiner* — Chandrahas Patel
(74) *Attorney, Agent, or Firm* — Joseph Kolodka

(57) ABSTRACT

The invention provides a sequential rate allocation process which assigns excess rates to variable-rate users in a sequential fashion according to specified priorities and yields a strongly pare-to-optimal rate allocation. The invention also provides two parallel rate allocation techniques for where all variable-rate users have the same priority. The first is a parallel symmetric rate and the second is an iterative rate allocation.

9 Claims, 4 Drawing Sheets

WIRELESS COMMUNICATION RATE ALLOCATION ON A GAUSSIAN INTERFERENCE CHANNEL

This application claims the benefit of U.S. Provisional Application No. 60/988,832, entitled "Successive Group Decoders for the K User Gaussian Interference Channel", filed on Nov. 19, 2007, the contents of which is incorporated by reference herein.

BACKGROUND OF THE INVENTION

The present invention relates generally to wireless communications, and more particularly, to a memory-less Gaussian interference channel (GIC) where K single-antenna users communicate with their respective receivers using Gaussian codebooks and specified power levels.

We consider a memory-less Gaussian interference channel (GIC) where K single-antenna users communicate with their respective receivers using Gaussian codebooks and specified power levels. The broadcast nature of the wireless channel ensures that each receiver receives the transmissions from all users. Each receiver employs a successive group decoder (SGD) with a specified complexity constraint, to decode its designated user. It is aware of the coding schemes employed by some or all other users and may choose to decode some or all of them only if it deems that doing so will aid the decoding of its desired user.

The Gaussian interference channel noted above presents the following problems:
1. Suppose the K users transmit at pre-determined rates. What is the optimal successive group decoder (which meets the complexity constraint) that should be employed at each receiver?
2. Next, suppose the K users are divided into two classes: the class of variable-rate users which demand as much rate as possible above their minimum acceptable rates and the class of fixed-rate users who only desire a constant rate. Then:
   2.1 Given the priorities of all variable-rate users, devise a sequential rate allocation scheme that yields a rate-vector that meets the minimum rate requirements of all users and is strongly pareto-optimal over the variable-rate users, i.e., the rate vector is such that the rate assigned to any variable-rate user can be increased only by decreasing the rate assigned to a variable-rate user with higher priority.
   2.2 Suppose all variable-rate users have the same priority. Devise a rate allocation scheme that yields a rate-vector that meets the minimum rate requirements of all users and is symmetric-fair over variable-rate users, i.e., each variable-rate user is assigned identical excess rate over its minimum rate requirement and no other such rate allocation can assign a higher rate to any variable-rate user.
   2.3 Suppose all variable-rate users have the same priority. Devise a rate allocation scheme that yields a rate-vector that meets the minimum rate requirements of all users and is max-min fair over variable-rate users, i.e., the rate allocation maximizes the smallest excess rate assigned to a variable-rate user over all possible rate allocations that meet the minimum rate requirements of all users.

There is also a generalized cognitive radio set-up where the K users are divided into two sets: the set of primary users and the set of secondary users. It can be assumed that the transmission rates of the primary users have been determined and each primary user is decodable at its primary receiver. The problems to be addressed are twofold. The first one is to design a method to pick an "active" set of secondary users and the second one is to perform rate allocation for the active set of secondary users. The constraints are that each primary user must achieve its pre-determined rate and no primary receiver will decode any secondary user.

Some special cases of the problems listed above have been attempted before by others. The discussion by A. Motohari and A. K. Khandani, "M-user Gaussian Interference Channles: To Decode the Interference or To Consider it as Noise," *IEEE ISIT*, June, 2007, considers a K user GIC where each user transmits at a fixed power and uses a single Gaussian codebook. However, their set-up assumes no complexity constraints on any receiver. The problem of maximizing the desired user's rate at a particular receiver is solved. Note that maximizing only the desired user's rate at a particular receiver may make other users un-decodable at their designated receivers. A sequential rate allocation algorithm is proposed for the case when there are no minimum rate constraints. Finally, an iterative parallel rate allocation algorithm is also provided but it is not monotonic and the rate-vectors obtained prior to convergence need not be decodable.

Another attempt, discussed by M. A. Maddah-Ali, Mahdavi-Doost and A. K. Khandani, "Optimal Order of Decoding for Max-Min Fairness in K-User Memory-less Interference Channels," *IEEE ISIT*, June, 2007, considers a K user GIC where each user transmits at a fixed power and uses a single codebook. Each receiver employs the SIC decoder (which is a particular type of SGD). A max-min fair parallel rate-algorithm is designed for the case where there are no minimum rate constraints and only one iteration is allowed.

Accordingly, for the K-User Gaussian situation discussed herein, there is a need for developing solutions which consider the success group decoder (SGD) at each receiver and which addresses the above problems.

SUMMARY OF THE INVENTION

In accordance with the invention, there is provided a method for allocating transmission rates in a wireless network, including the steps of associating transmitters with corresponding receivers for communicating on an interference channel in the wireless network, and allocating a transmission rate to each transmitter for decoding by its corresponding receiver, the allocated transmission rate being equal to a desired rate of a fixed user rate and being no less than a minimum rate of a variable user rate. The step of allocating can include a sequential allocation that meets the minimum rate requirement of all users and assigns excess rates to variable rate users in a sequential fashion according to specified priorities. The step of allocating can include a parallel symmetric rate allocation when all variable rate users have the same priority and that meets minimum rate requirements of all users and is symmetric fair. The step of allocating can include a parallel iterative rate allocation with the sequence of rate allocations obtained for each user being non-decreasing and a rate allocation vector obtained after each iteration meets minimum rate requirements for all users and is max-min fair when all variable rate users have the same priority.

In accordance with an another aspect of the invention, there is provided a successive group decoder with a specified complexity constraint and including an association with a receiver responsive to a corresponding transmitter for communicating on an interference channel in the wireless network of multiple transmitter and receiver pairs, and an allocation of a transmission rate to the transmitter for decoding by the corresponding receiver, the allocated transmission rate being equal to a desired rate of a fixed user rate and being no less than a minimum rate of a variable user rate.

In accordance with a yet further aspect of the invention, there is provided a method for allocating transmission rates in a generalized cognitive radio setup, including the steps of: determining an active set of secondary transmitter-receiver pairs for communicating simultaneously along with primary transmitter and receiver pairs on an interference channel in the wireless network, and allocating a transmission rate to each active secondary transmitter for decoding by its corresponding secondary receiver.

BRIEF DESCRIPTION OF DRAWINGS

These and other advantages of the invention will be apparent to those of ordinary skill in the art by reference to the following detailed description and the accompanying drawings.

DETAILED DESCRIPTION

Given the rates of all K transmitters in the Gaussian interference channel GIC, the invention is directed to a method for obtaining the optimal successive group decoder SGD (OSGD) which minimizes the outage probability of each user achieved by its designated receiver.

The inventive method provides a sequential rate allocation process which meets the minimum rate requirements of all users. It assigns the excess rates to the variable-rate users in a sequential fashion according to the specified priorities and yields a strongly pareto-optimal rate allocation. The inventive method also provides two parallel rate allocation techniques for the case where all the variable-rate users have the same priority. The first one is a parallel symmetric rate allocation method which yields a rate vector that meets the minimum rate requirements of all users and is symmetric fair. The second is an iterative rate allocation method which provably converges and is monotonic in that the sequence of rate allocations obtained for each user is non-decreasing. Moreover the rate-allocation vector obtained after each iteration meets the minimum rate requirements of all users and is max-min fair. The invention also provides another sequential process and a parallel iterative process, which select an active set of secondary users and assigns rates to them, to enable a cognitive radio set-up.

Figure 1:
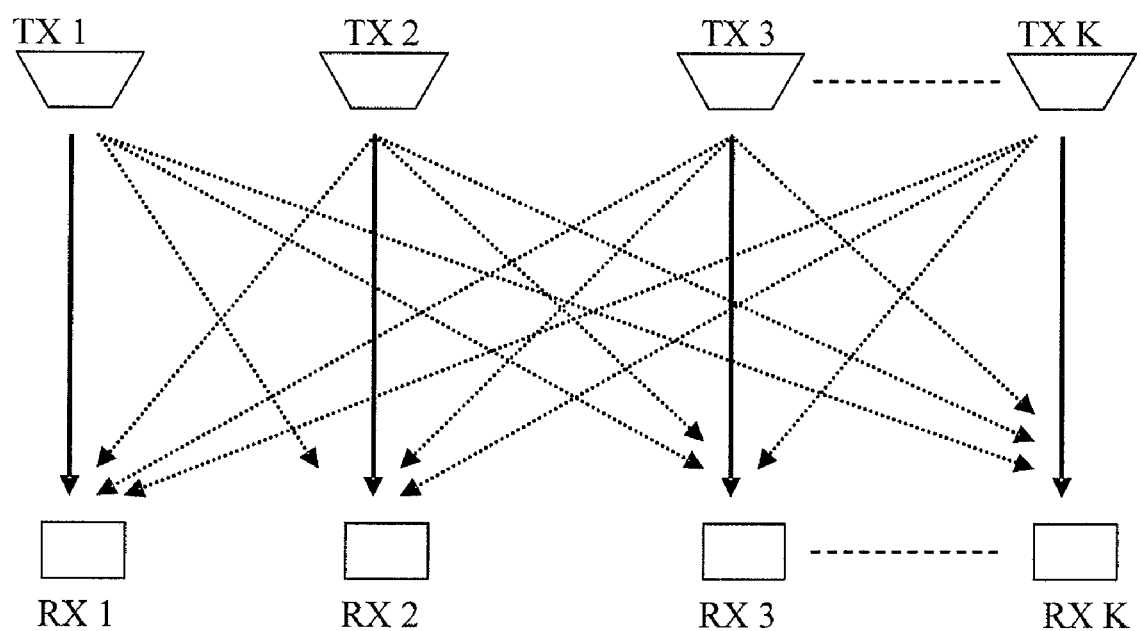
FIG. 1 is a block diagram of an exemplary wireless network in which the inventive rate allocation methods can be employed.

Referring to the network diagram of FIG. 1, we consider a wireless network where K transceiver pairs TX1-RX1, . . . TXK-RXK communicate simultaneously over the same bandwidth. Each transmitter (user) has a single transmit antenna and wants to communicate with its desired receiver. For instance in FIG. 1, transmitter k wants to communicate with receiver k. The signal transmitted by any transmitter is received by all receivers RX1, . . . RXK after being corrupted by the propagation environment as well as additive Gaussian noise.

Each receiver, which can be equipped with multiple receive antennas, is interested only in the signal of its desired transmitter and employs a successive group decoder (SGD) with a specified complexity constraint. It is aware of the coding schemes employed by some or all of the other users and may choose to decode the signals transmitted by such users only if it deems that doing so will aid the decoding of its desired user.

Users are divided into two classes: the class of variable-rate users which demand as much rate as possible above their minimum acceptable rates and the class of fixed-rate users who only desire a constant rate. It is assumed that if each user transmits at its minimum or desired rate, then all users can be reliably decoded at their respective receivers.

This invention considers the problem of rate allocation over such a wireless network, in which we have to assign a data transmission rate to each transmitter (user) such that it can be reliably decoded by its desired receiver. The assigned rate must be equal to the desired rate of a fixed-rate user and must be no less than the minimum rate of a variable-rate user.

In all the rate-allocation schemes presented in the sequel, the vector d denotes the vector containing the minimum rate of each variable-rate user and the desired rate of each fixed-rate user.

Users numbered from 1-to-|V| are assumed to be the variable-rate users and the remaining ones are assumed to be the fixed-rate users.

Figure 2:
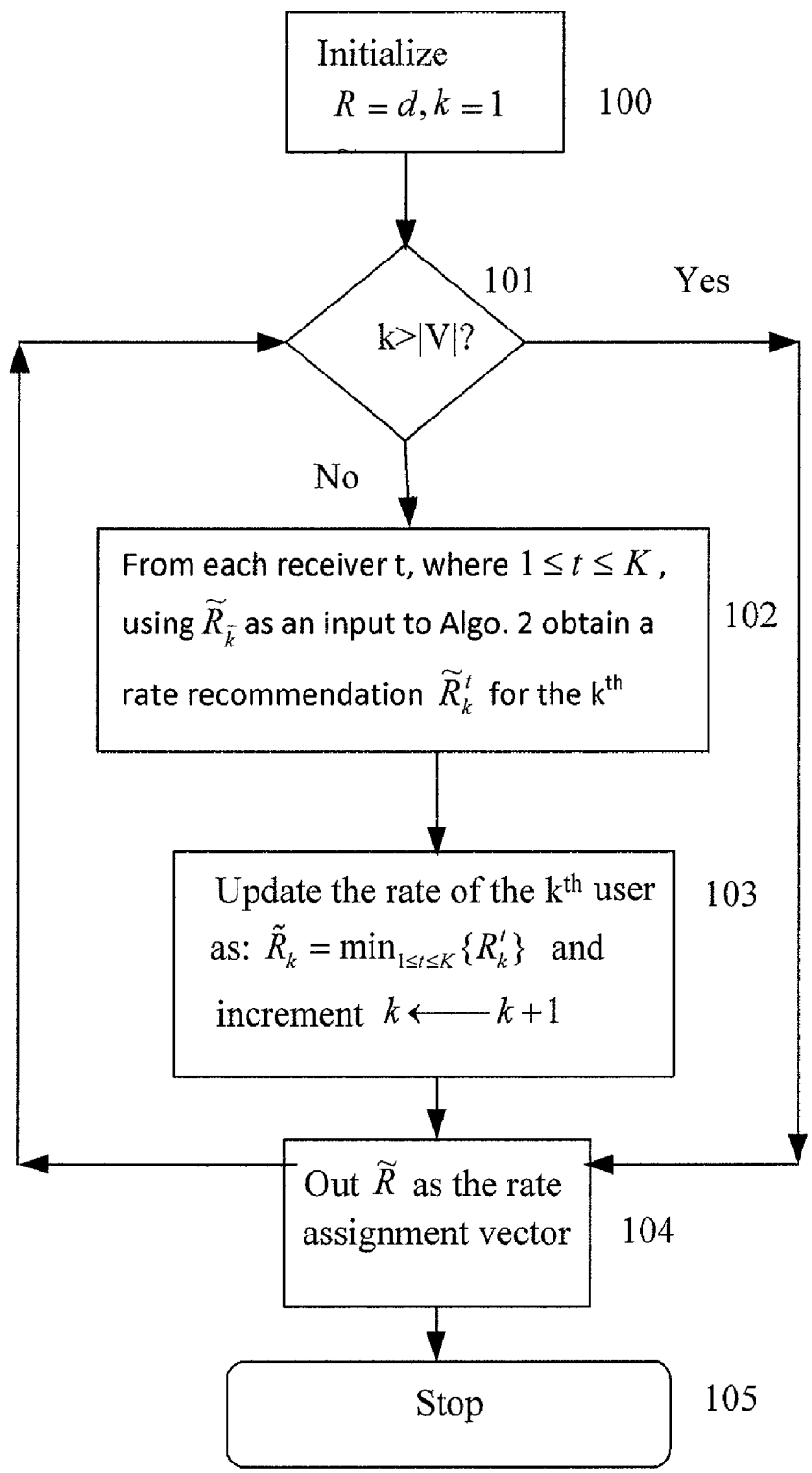
FIG. 2 is a flowchart of a sequential rate allocation in accordance with the invention.

The flowchart of FIG. 2 shows the sequential rate allocation method in accordance with the invention. Without loss of generality, we assume that the variable-rate users are labeled such that user-1 has the highest priority, user-2 has the second highest priority and so on. In the sequential rate allocation, the variable-rate users are assigned rates in the order of their priorities.

The sequential rate-allocation procedure is initiated in step 100 with the rate-allocation vector $\tilde{R}=d$.

Then the current status of k is justified in step 101. If k>|V|, then go to step 104, else we go to step 102.

In step 102, from each receiver t, where $1 \leq t \leq K$, using $\tilde{R}_{\bar{k}}$ as an input to Algo. 2 obtain a rate recommendation $\tilde{R}_k^t$ for the $k^{th}$ variable-rate user. Algo.2 is a procedure that is implemented at a specified receiver t. As inputs, it accepts the complexity constraint for the SGD used at receiver t (which is specified as the maximum group size acceptable at receiver t), the channel response vector seen from each transmitter by receiver t, a scalar k which specifies the index of the variable-rate user for which the rate recommendation is being made and $\tilde{R}_{\bar{k}}$ which denotes the rate vector containing the current rates of all users other than user k. As an output, it yields a scalar rate recommendation $\tilde{R}_k^t$ for variable-rate user k such that if $\tilde{R}_k^t$ is assigned to user k and the other users are allocated their respective rates in $\tilde{R}_{\bar{k}}$, then user t is decodable at receiver t. Note that all the scalar rate recommendations $\{\tilde{R}_k^t\}_{t=1}^K$ can be obtained by running Algo.2 at each receiver in parallel.

In step 103, the rate of the $k^{th}$ user is updated as: $\tilde{R}_k = \min_{1 \leq t \leq K} \{R_k^t\}$ and we increment k ← k+1, and the process loops back to step 101

In step 104, the rate-allocation vector containing the rate assignment of each user is returned as an output and the process terminates at step 105.

Figure 3:
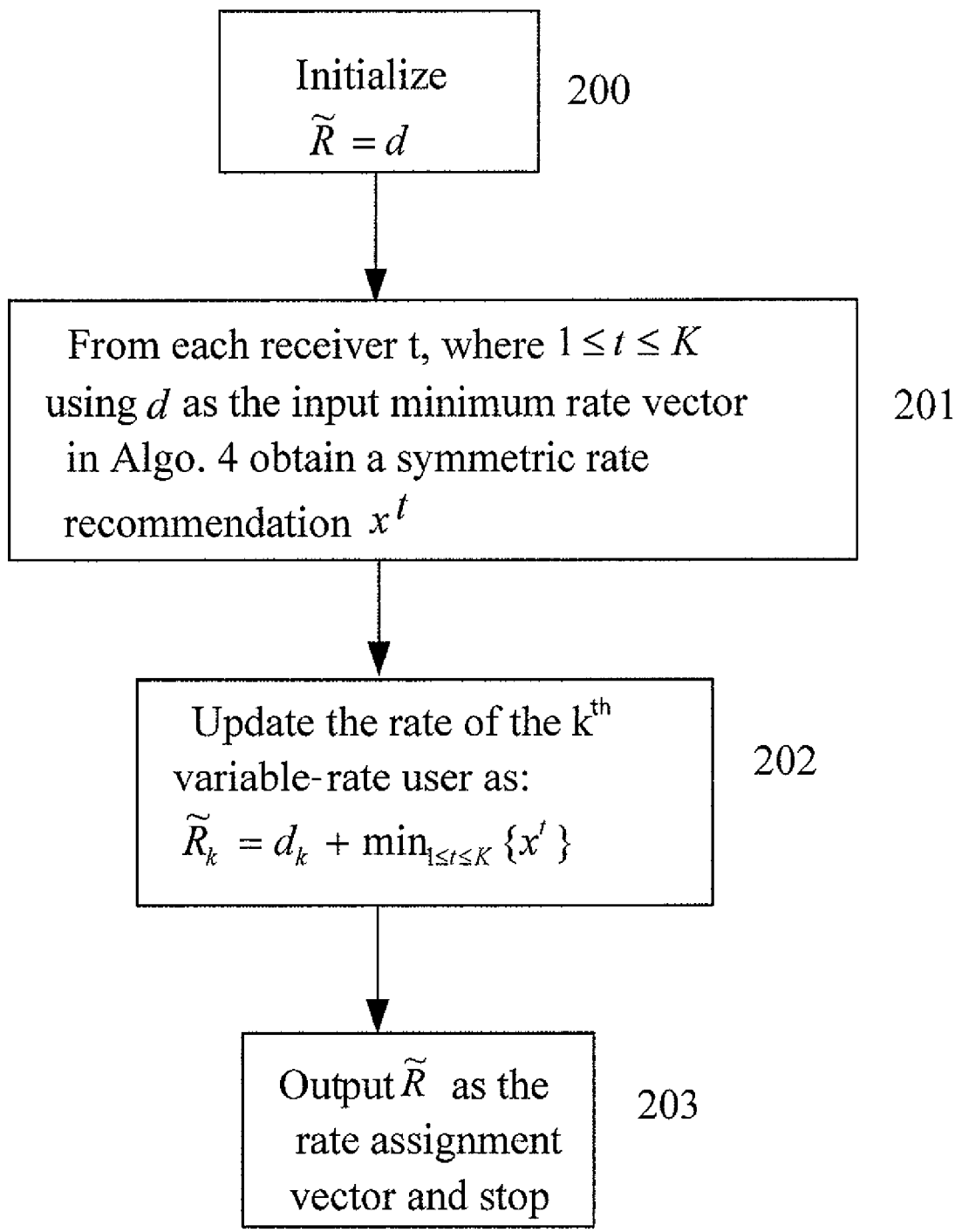
FIG. 3 is a flowchart of a parallel symmetric rate allocation in accordance with the invention.

The flowchart of FIG. 3 shows the parallel symmetric rate allocation in accordance with the invention.

In step 200, the parallel symmetric rate-allocation procedure is initiated with the rate-allocation vector $\tilde{R}=d$.

In step 201, from each receiver t, where $1 \leq t \leq K$, using d as the input minimum rate vector in Algo. 4 obtain a symmetric rate recommendation $x^t$. Algo.4 is a procedure that is implemented at a specified receiver t. As inputs, it accepts the complexity constraint for the SGD used at receiver t (which is specified as the maximum group size acceptable at receiver t), the channel response vector seen from each transmitter by receiver t, a minimum rate vector containing the minimum (or desired) rates of all users. As an output, it yields a scalar rate recommendation $x^t$ such that if the minimum rates of all variable-rate users are incremented by $x^t$ and the rates of the fixed-rate users are unchanged, then user t is decodable at receiver t. Note that all the scalar rate recommendations $\{x^t\}_{t=1}^K$ can be obtained by running Algo.4 at each receiver in parallel.

In step 202, the rate of the $k^{th}$ variable-rate user is updated as: $\tilde{R}_k = d_k + \min_{1 \leq t \leq K} \{x^t\}$ for all $1 \leq k \leq |V|$.

In step 203, the rate-allocation vector containing the rate assignment of each user is returned as an output and the process terminates.

Figure 4:
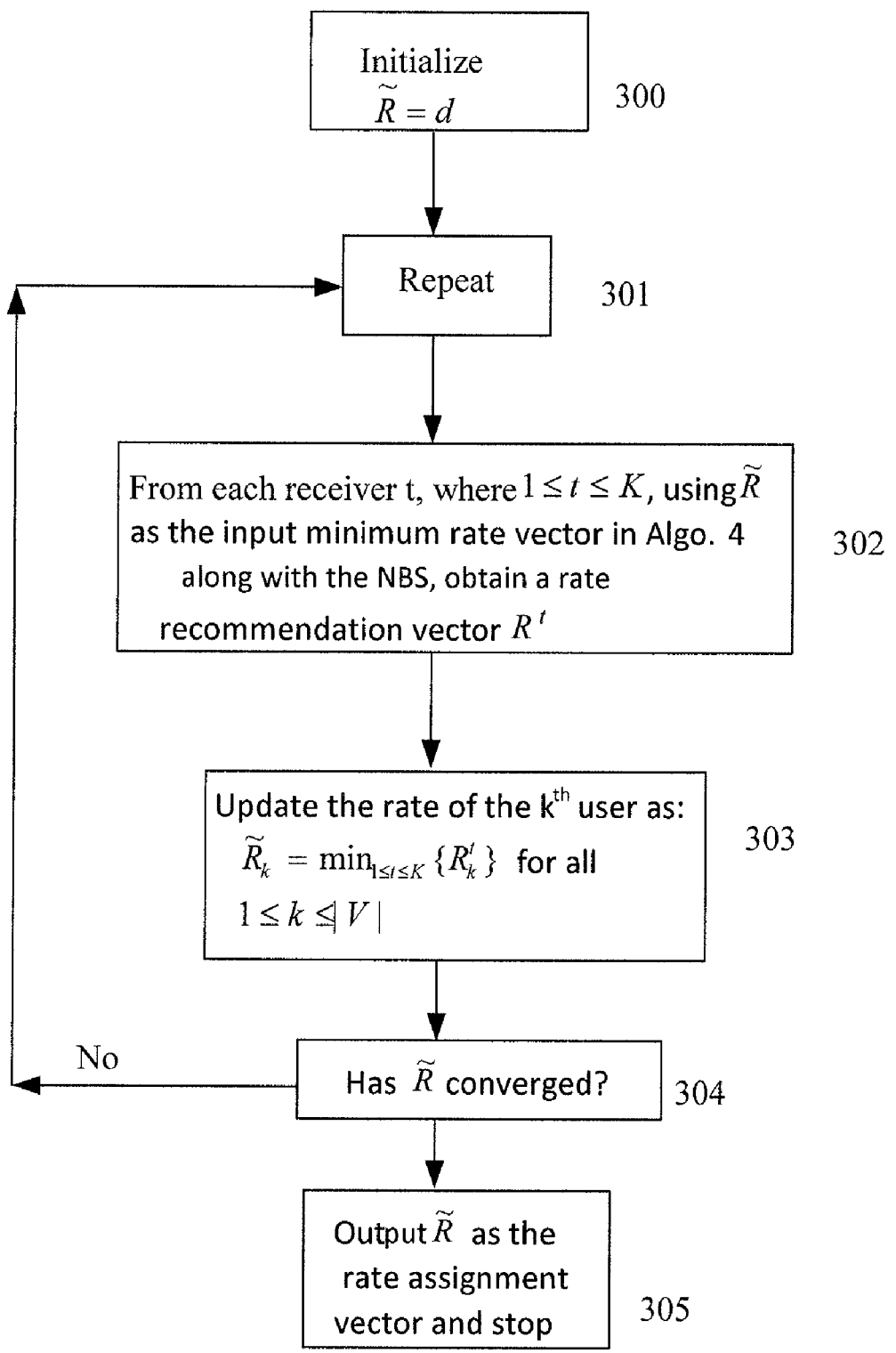
FIG. 4 is a flowchart of a parallel iterative rate allocation in accordance with the invention.

The flowchart of FIG. 4 shows the parallel iterative rate allocation in accordance with the inventive method.

In step 300; the parallel iterative rate-allocation procedure is initiated with the rate-allocation vector $\tilde{R} = d$.

In step 301, the process enters a loop.

In step 302, from each receiver t, where $1 \leq t \leq K$, using $\tilde{R}$ as the input minimum rate vector in Algo. 4 we first obtain an ordered partition. Using that ordered partition, a rate recommendation vector $R^t$ based on the Nash bargaining solution (NBS) is then obtained. Note that the rate vectors $\{R^t\}_{t=1}^K$ can be computed at each respective receiver in parallel.

In step 303, the rate of the $k^{th}$ variable-rate user is updated as: $\tilde{R}_k = \min_{1 \leq t \leq K} \{R_k^t\}$ for all $1 \leq k \leq |V|$.

In step 304, a convergence check is conducted. If the rate vector has converged then the process goes to step 305 otherwise it loops back to step 301.

In step 305, the rate-allocation vector containing the rate assignment of each user is returned as an output and the process terminates.

The inventive sequential rate, parallel symmetric rate and parallel iterative rate allocations detailed above, in FIGS. 2, 3 and 4, allow for a design of rate allocations subject to a minimum rate and complexity constraints over a wireless network. Furthermore, the sequential and parallel rate allocation techniques have also been extended for a generalized cognitive radio set-up. Another inventive method enables a procedure to determine an optimal subset of interferers that must be decoded along with the desired user at any receiver, given the rates assigned to all users and the complexity constraint. This procedure also reveals an ordered partition which can be used for decoding these users.

The sequential rate allocation method employs a procedure that yields the maximum rate that can be assigned to a specified user such that the given receiver can decode its desired user subject to complexity constraints. The sequential rate allocation yields a strongly pareto-optimal rate allocation. The sequential rate allocation method has been extended for use in a cognitive radio setup, where prior to the rate allocation it determines an active set of secondary transmitter-receiver pairs. The parallel symmetric rate allocation yields a symmetric fair rate allocation and employs a procedure that yields an optimal ordered partition for a particular metric at each receiver. The iterative parallel rate allocation method provably converges, is monotonic and yields a max-min fair rate allocation. The parallel rate allocation method has been extended for use in a cognitive radio setup.

The inventive methods solve the problems arising in a Gaussian interference channel (GIC) where K single-antenna users communicate with their respective receivers using Gaussian codebooks and specified power levels, as noted in the background of the invention. The discussion by A. Motohari and A. K. Khandani, "M-user Gaussian Interference Channles: To Decode the Interference or To Consider it as Noise", describes a procedure to maximize the desired user's rate, but it does not disclose or suggest the sequential rate allocation according to FIG. 2 which allows for implementation at the designated receivers with complexity and minimum rate constraints. Unlike the rate allocation permitted by the inventive methods, the max-min fair parallel rate allocation discussed by M. A. Maddah-Ali, Mahdavi-Doost and A. K. Khandani, "Optimal Order of Decoding for Max-Min Fairness in K-User Memory-less Interference Channels," allows only 1 iteration, removes minimum rate constraints and sets all the maximum-group-size parameters to be 1.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for allocating transmission rates in a wireless network, comprising the steps of
   associating transmitters with corresponding receivers for communicating on an interference channel in the wireless network, and
   allocating a transmission rate to each transmitter for decoding by its corresponding receiver, the allocated transmission rate being equal to a desired rate of a fixed user rate and being no less than a minimum rate of a variable user rate;
   wherein said allocating comprises a sequential allocation meeting the minimum rate requirement of all users and assigning excess rates to variable rate users in a sequential fashion according to specified priorities; said sequential allocation comprising, from each receiver, using a rate-allocation vector as an input to obtain a rate recommendation for a specified variable rate user, said using the rate allocation vector as an input to obtain the rate recommendation comprising a procedure implemented at a specified receiver and responsive to a complexity constraint for a successive group decoder at the specified receiver, channel response vector seen from each transmitter by the specified receiver, a scalar which specifies the index of a variable rate user for which the rate recommendation is being made and a rate-allocation vector that contains the current assigned rates of other users.

2. The method of claim 1, wherein using a rate-allocation vector as an input to obtain a rate recommendation comprises a procedure providing a scalar rate recommendation for a specified variable rate user such that if the rate-recommendation is assigned to the specified user and the other users are allocated their respective rates in a rate allocation vector, then the specified receiver can decode its desired or corresponding user.

3. The method of claim 1, wherein the step of allocating comprises a parallel iterative rate allocation when all variable rate users have the same priority and in which the sequence of rate allocations obtained for each user is non-decreasing and a rate allocation vector obtained after each iteration meets minimum rate requirements for all users and is max-min fair.

4. The method of claim 3, wherein the parallel iterative rate allocation includes, from each receiver, using a rate-allocation vector as an input minimum rate vector to obtain a rate recommendation vector.

5. The method of claim 4, wherein using the rate-allocation vector as an input minimum rate vector to obtain a rate recommendation vector comprises using the rate-allocation vector to first obtain an ordered partition, then obtaining the rate recommendation vector based on a Nash bargaining solution using the obtained ordered partition.

6. The method of claim 1, wherein the step of allocating comprises a parallel symmetric rate allocation when all variable rate users have the same priority and which meets minimum rate requirements of all users and is symmetric fair.

7. The method of claim 6, wherein the parallel symmetric rate allocation includes, from each receiver, using a rate-allocation vector as an input minimum rate vector to obtain a symmetric rate recommendation.

8. The method of claim 7, wherein using the rate-allocation vector as an input minimum rate vector to obtain a symmetric rate recommendation comprises a procedure implemented at a specified receiver and responsive to a complexity constraint for a successive group decoder at the specified receiver, channel response vector seen from each transmitter by the specified receiver, a minimum rate vector containing the minimum rates of all users.

9. The method of claim 7, wherein using the rate-allocation vector as an input minimum rate vector to obtain a symmetric rate recommendation comprises a procedure providing a scalar rate recommendation such that if the minimum rates of all variable-rate users are incremented by the scalar rate recommendation and the rates of the fixed-rate users are unchanged, then the specified receiver can decode its desired or corresponding user.

* * * * *